(12) United States Patent
Daijavad et al.

(10) Patent No.: US 12,437,110 B2
(45) Date of Patent: Oct. 7, 2025

(54) PERSONALIZED AVATARS WITH CUSTOM LEVELS OF PRIVACY

(71) Applicant: International Business Machines Corporation, Armonk, NY (US)

(72) Inventors: Shahrokh Daijavad, Morgan Hill, CA (US); Dinesh C. Verma, New Castle, NY (US); Dan Gutfreund, Brighton, MA (US); David Joel Edelsohn, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 18/381,262

(22) Filed: Oct. 18, 2023

(65) Prior Publication Data

US 2025/0131124 A1    Apr. 24, 2025

(51) Int. Cl.
*G06F 21/62* (2013.01)

(52) U.S. Cl.
CPC .............................. *G06F 21/6254* (2013.01)

(58) Field of Classification Search
CPC .................................................. G06F 21/6254
See application file for complete search history.

(56) References Cited

U.S. PATENT DOCUMENTS

| | | | |
|---|---|---|---|
| 2,292,387 A | 8/1942 | Markey | |
| 9,805,547 B2* | 10/2017 | Price | G06F 21/35 |
| 10,395,187 B2* | 8/2019 | Weyl | G06Q 10/06311 |
| 10,585,994 B2* | 3/2020 | Sawyer | G06F 21/602 |
| 11,204,991 B1* | 12/2021 | Giraud | G06F 21/32 |
| 11,763,510 B2* | 9/2023 | Miller, IV | G06F 1/163 |
| | | | 345/474 |
| 2004/0169620 A1 | 9/2004 | Baram | |
| 2007/0112574 A1* | 5/2007 | Greene | H04W 12/086 |
| | | | 709/201 |
| 2010/0083140 A1 | 4/2010 | Dawson et al. | |

(Continued)

OTHER PUBLICATIONS

Jenson, Jennifer et al., "Playing With Our Selves, Multiplicity and identity in online gaming", Feminist Media Studies, vol. 15, Issue 5, 860-879, DOI: 10.1080/14680777.2015.1006652, Published online Feb. 11, 2015, 21 pages.

(Continued)

*Primary Examiner* — Azizul Choudhury
(74) *Attorney, Agent, or Firm* — CANTOR COLBURN LLP; Anthony Mauricio Pallone

(57) ABSTRACT

Mechanisms are provided for customizing an avatar in a virtual environment. A user that is interacting with the virtual environment, and to whom the avatar is to be rendered in the virtual environment, is identified and classified with regard to a plurality of affinity groups specifying levels of affinity between the first user and an operator of the avatar. A user security and privacy policy (USPP) data structure, associated with the operator, is retrieved that specifying security and privacy policies for each affinity group in the plurality of affinity groups. Based on the user classification and the security and privacy policy, an anonymization operation is applied to static and/or dynamic characteristics data for the operator which are used to render the avatar, to thereby generate anonymized characteristic data. The anonymized characteristic data is output for rendering the avatar in the virtual environment.

18 Claims, 8 Drawing Sheets

(56) References Cited

U.S. PATENT DOCUMENTS

| | | | |
|---|---|---|---|
| 2010/0083148 A1 | 4/2010 | Finn et al. | |
| 2012/0167235 A1* | 6/2012 | Donfried | G06Q 30/0201 |
| | | | 707/769 |
| 2016/0198287 A1* | 7/2016 | Hulusi | H04W 12/08 |
| | | | 455/41.1 |
| 2018/0139069 A1* | 5/2018 | Rawlins | G06F 3/04886 |
| 2018/0240275 A1* | 8/2018 | Clements | G16H 80/00 |
| 2020/0118334 A1 | 4/2020 | Kaifosh et al. | |
| 2020/0238952 A1* | 7/2020 | Lindsay | G06V 30/194 |
| 2021/0233318 A1 | 7/2021 | Stolzenberg et al. | |
| 2021/0326967 A1* | 10/2021 | Geekee | G06V 20/41 |
| 2023/0267564 A1* | 8/2023 | Giraud | H04L 63/0861 |
| | | | 705/325 |
| 2023/0421611 A1* | 12/2023 | Kamath | H04L 63/20 |

OTHER PUBLICATIONS

Venkatesh, Alladi, "Social Media, Digital Self, and Privacy: A Socio-Analytical Perspective of the Consumer as the Digital Avatar", Journal of the Association for Consumer Research, vol. 1, No. 3, Published online May 27, 2016, 15 pages.

Vladimirov, Ivaylo et al., "Security and Privacy Protection Obstacles with 3D Reconstructed Models of People in Applications and the Metaverse: A Survey", 2022 57th International Scientific Conference on Information, Communication and Energy Systems and Technologies (ICEST), Jun. 16-18, 2022, 4 pages.

"Facebook is building the future of connection with lifelike avatars", Meta, Mar. 12, 2019, Updated Apr. 14, 2023, 19 pages.

Anonymous, "Metaverse Action Obfuscation", IP.com Prior Art Database Technical Disclosure, IP.com No. IPCOM000270636D, Jul. 25, 2022, 3 pages.

Anonymous, "Smart Transformations of Avatars for Privacy", IP.com Prior Art Database Technical Disclosure, IP.com No. IPCOM000260847D, Dec. 27, 2019, 5 pages.

Jenson, Jennifer et al., "Playing With Our Selves, Multiplicity and identity in online gaming", Feminist Media Studies, vol. 15, Issue 5, 860-879, DOI: 10.1080/14680777.2015.1006652, Published online Feb. 11, 2015, Abstract, 3 pages.

Miller, Mark R. et al., "Personal identifiability of user tracking data during observation of 360-degree VR video", Scientific Reports 10, 17404 (2020), Oct. 15, 2020, 10 pages.

Nair, Vivek et al., "Unique Identification of 50,000+ Virtual Reality Users from Head & Hand Motion Data", arXiv:2302.08927v1 [cs.CR], Feb. 17, 2023, 14 pages.

Venkatesh, Alladi, "Social Media, Digital Self, and Privacy: A Socio-Analytical Perspective of the Consumer as the Digital Avatar", Journal of the Association for Consumer Research, vol. 1, No. 3, Jul. 2016, Abstract, 1 page.

Vladimirov, Ivaylo et al., "Security and Privacy Protection Obstacles with 3D Reconstructed Models of People in Applications and the Metaverse: A Survey", 2022 57th International Scientific Conference on Information, Communication and Energy Systems and Technologies (ICEST), Jun. 16-18, 2022, Abstract, 4 pages.

Wang, Yuntao et al., "A Survey on Metaverse: Fundamentals, Security, and Privacy", IEEE Communications Surveys & Tutorials, vol. 25, No. 1, First Quarter 2023, Sep. 7, 2022, 34 pages.

Wang, Ningfei et al., "Integration of Static and Dynamic Code Stylometry Analysis for Programmer De-anonymization", AISec '18: Proceedings of the 11th ACM Workshop on Artificial Intelligence and Security, Oct. 19, 2018, 11 pages.

* cited by examiner

PERSONALIZED AVATARS WITH CUSTOM LEVELS OF PRIVACY

BACKGROUND

The present application relates generally to an improved data processing apparatus and method and more specifically to an improved computing tool and improved computing tool operations/functionality for generating, in virtual environments, personalized avatars that have customized levels of privacy in the rendering of the avatars.

Virtual environments are fast becoming a mainstay of modern society. Virtual environments are utilized for entertainment purposes, e.g., video gaming, such as in massively multiplayer online (MMO) games, for electronic commerce, and for productivity and collaboration, such as by organizations to allow users to perform work in virtualized settings, allow users to communicate and interact with each other even though the users are physically distant from one another, and the like. Virtual environments have been provided to allow users to "live" a virtual life in the virtual environment, e.g., Second Life, The Sims, and the like. Much work is currently directed to advances in providing a Metaverse, i.e., a large scale composition of virtual environments, in which users may even own virtualized property.

In these virtual environments, users are often represented as virtualized versions of themselves, i.e., avatars, which may or may not be consistent with the user's physical appearance. The avatar's motions in the virtual environments may be specified by user inputs, which may be from various types of user interface devices including keyboards, computer pointing devices such as computer mouse, touchpad, trackball or the like, and in more advanced configurations may be sensed from motion sensors worn on, held by, or otherwise associated with various parts of a user's body. In some cases, advanced image recognition capabilities are provided that detect eye gaze direction, facial movements, and other types of movements and micromovements of the user. The user inputs are used to dictate how the avatar moves and operates within the virtual environment.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for customizing an avatar in a virtual environment. The method comprises identifying a first user that is interacting with the virtual environment and to whom the avatar is to be rendered in the virtual environment, and determining a classification of the first user with regard to a plurality of affinity groups specifying a level of affinity between the first user and an operator of the avatar. The method also comprises retrieving a first user security and privacy policy (USPP) data structure, associated with the operator, specifying security and privacy policies for each affinity group in the plurality of affinity groups. At least two affinity groups have different security and privacy policies specified in the USPP data structure. The method further comprises applying, based on the classification of the first user into an affinity group, and a security and privacy policy associated with the affinity group as specified in the USPP data structure, an anonymization operation to at least one of static or dynamic characteristics data for the operator which are used to render the avatar, to thereby generate anonymized characteristic data. In addition, the method comprises outputting the anonymized characteristic data for rendering the avatar in the virtual environment, wherein the avatar is rendered as a first avatar that has avatar characteristics corresponding to the anonymized versions of the at least one static or dynamic characteristics data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
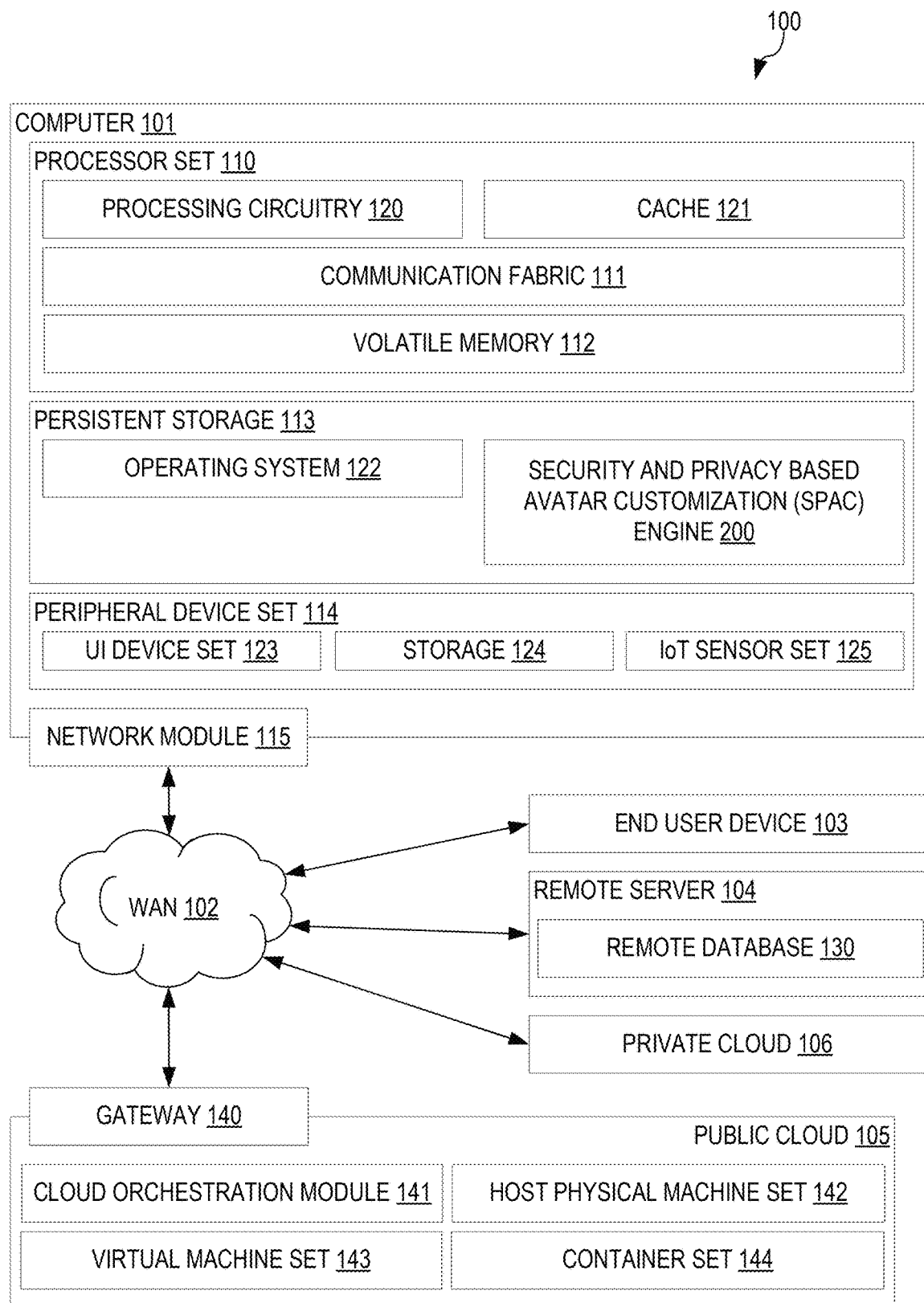
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for generating, in virtual environments, personalized avatars that have customized levels of privacy in the rendering of the avatars. The illustrative embodiments provide mechanisms to anonymize the presentation of avatars to other users in a virtual environment based on a level of security and privacy specified by the user represented by the avatar, such that the same user may be represented as different avatars to different classifications of other users, with varying levels of security or privacy. This may be performed with regard to both static and dynamic characteristics of the user that are reflected in the rendering of the avatar, e.g., both appearance and motion of the avatar. Hence, the identity of the user associated with an avatar may be more or less obfuscated with regard to different other users in the virtual environment, based on associations of the user with these other users. In order to make the description more clear, hereafter the user who is being represented by the avatar will be referred to as the "operator" of the avatar and the other users that may perceive the avatar in renderings of the virtual environment will be referred to as the "other users".

As the illustrative embodiments are specifically directed to improving the way in which virtual avatars are presented in virtual environments, it can be appreciated that the illustrative embodiments are specifically directed to improving computer functionality and computer technology by providing a new functionality not previously able to be obtained by existing virtual environment systems. That is, the illustrative embodiments provide dynamic customization of the operator's avatar based on security and privacy such that the avatar's static and dynamic characteristics may differ depending on the other users that are perceiving the operator's avatar. This is a functionality that cannot be practically performed in the human mind and is not organizing human activity when rendering the avatar in the virtual environment. Moreover, even if the operations include mathematical functions and mathematical concepts, the operations themselves would only be based on mathematical concepts or mathematical functions, and are not directed to the mathematical concepts or functions themselves.

The mechanisms of the illustrative embodiments are specifically directed to computer generated/augmented virtual environments and specifically to improving the way in which security and privacy are provided to users with regard to their representations as avatars in these virtual environments. The term "virtual environment" or "virtual reality" and the like, as used herein, are intended to reference any computer generated environment in which users interact with one or more virtual elements, e.g., virtual objects, of the environment, and other virtual representations, e.g., avatars, of other users. These virtual elements and avatars are not physically present in the environment, but exist only in the computer even though they may be represented graphically, audibly, etc., for perceiving by a user through the user's senses, e.g., visual, audible, and tactile senses, and in some cases through smell and/or taste. Thus, references to "virtual" environments and "virtual" reality is also intended to encompass augmented reality and augmented environments, as well as any other currently existing or later developed fully or partially virtualized environments. In the illustrative embodiments, the virtual environment may be referenced as the metaverse which is a combination of virtual environments that together make up a much larger virtual environment.

As noted above, users are increasingly choosing to spend time in virtual environments both for recreation as well as work related collaborations. Users are represented in these virtual environments by avatars. These avatars may have their basic graphical representations customized by the user to what the user wishes to represent them in the virtual environment, which may or may not resemble the user in the physical (real world) environment, e.g., a user may choose a fantasy character, e.g., an orc, to represent them rather than a human figure. While the avatar may not resemble the user in its appearance in the virtual environment, it has been recently determined that users can be uniquely identified from the motions of the avatar in the virtual environment. For example, in Nair et al., "Unique Identification of 50,000+ Virtual Reality Users from Head & Hand Motion Data," arXiv.2302.08927, Feb. 17, 2023, it was determined that users could be uniquely identified from just their head and hand motion relative to virtual objects. A classification model only needed training on 5 minutes of data per person in order to be able to unique identify the user amongst the entire pool of 50,000+ users with a 94.33% accuracy from 100 seconds of motion data, and with 73.20% accuracy from just 10 seconds of motion data. Thus, the ability to be able to unique identify individuals from the motions of their avatars in a virtual environment poses a significant security and privacy threat for which there is currently no adequate solution. While a user can try to anonymize their avatar by modifying its appearance such that it does not look like the user in the physical world, this will not avoid identification of the user from the avatar's motions which are tied to the user's input, which is dependent on the user's motions in the physical or real world.

It has long been recognized that individuals can be identified from distinct biomechanical motion patterns, e.g., a user's gait, twitching movements, stance, eye movements, and any other patterns of movements or micromovements, where movements are changes in position that are easily discernable by the human eye, e.g., large arm movements, walking, hand movements, head movements, and the like, and micromovements are movements that are not able to be easily perceived by the human eye without specific focusing on those micromovements or using sensor mechanisms to detect the micromovement, e.g., ticks, twitches, dilation of the eye, etc. The identification of biomechanical motion patterns and correlating them with individuals is on par with fingerprinting when it comes to uniquely identifying individuals.

Thus, it would be beneficial to have a mechanism that can customize the rendering and presentation of an operator's avatar, not only with regard to static characteristics, e.g., appearance, but also with regard to dynamic characteristics, such as motions and micromotions of the operator. This customization may be achieved by encoding multiple levels of static and dynamic information about the operator, where these levels can be associated with different classifications of other users, e.g., different cohorts of other users. The different levels of operator information may be used to render different representations of avatars in the virtual environment to represent the operator to other users, such that different other users will see the avatar differently based on the specific cohort in which the other user is classified. In this way, a multiplicity of avatars for the operator may be generated and used to represent the operator to other users.

In this way, the operator of the avatar can specify different levels of security or privacy to apply to the rendering of the operator's avatar based on the cohorts of other users. That is, different levels of obfuscation of the operator's identity may be performed for different cohorts of other users. For those other users classified into a cohort with which the operator has a high level of affiliation, e.g., work groups in the operator's own company, family members, etc., the rendering of the avatar may be presented with no obfuscation, i.e., full static and dynamic characteristics being represented in the presentation of the avatar to these other users such that those users can uniquely identify the operator. For those other users classified into a cohort with which the operator has a no or a minimal level of affiliation, e.g., users associated with a different company, a high level of obfuscation may be applied to the presentation of the operator's avatar such that these other users will not see the actual static and/or dynamic characteristics of the operator's avatar and be able to uniquely identify the operator.

With the mechanisms of the illustrative embodiments, different levels of operator information are available to various affinity groups or cohorts of other users and these different levels of operator information are used to customize the presentation of the operator's avatar to those other users according to their affinity group or cohort. As a result, varying degrees of personally identifiable characteristics of the operator that are represented in the rendering of the operator's avatar are made possible both with regard to static and dynamic (e.g., motions or micromotions) characteristics of the avatar. The obfuscation of the personally identifiable information used to render static and dynamic characteristics of the avatar may be implemented in different ways by combining both static and dynamic obfuscation schemes. Static schemes use operator information that does not change in time, or which does not change often in time, such as which cohort groups the operator belongs to (e.g., race, gender, ethnicity, company affiliation, age, etc.). Dynamic schemes use time-series information, such as movements and micromovements of the operator, during a virtual environment session. These static and dynamic schemes for obfuscating the personally identifiable information of the operator that are used to render characteristics of the avatar may be used to make the operator less identifiable to other users who have less affinity to the operator and more identifiable to other users that have a greater level of affinity to the operator.

The level of affinity may be determined based on affinity groups or cohorts, and/or operator specified user affinity for certain other users, e.g., the operator may specify a level of affinity for particular other users, such as "Joe Smith" is my "Friend", where "Friend" is an affinity group (or cohort) and "Joe Smith" is a specific other user. Thus, the operator may specify specific affinities of specific other users. However, in other cases, classifications of other users may be automatically determined by the mechanisms of the illustrative embodiments based on comparisons of various characteristics of the other users to the characteristics of the operator, social networking interactions between the operator and other users, contact list information in the operator's electronic communication applications, natural language processing of communications between the operator and the other users to thereby classify the other users into various affinity groups or cohorts, and any other suitable source of information that may be indicative of a relationship between the operator and the other users.

The illustrative embodiments employ one or more static and/or dynamic schemes for customizing a level of security/privacy of operator information represented in the representation of an avatar in the virtual environment based on affinity of the operator with the other users interacting with the operator's avatar. In one illustrative embodiment, the static scheme for avatar security/privacy involves the training of a machine learning computer model, e.g., a neural network, to anonymize characteristics or "features" of the avatar. There may be a differently trained machine learning computer model for each defined affinity group or cohort of other users, e.g., if there are cohorts for "work", "family", "friends", "acquaintances", and "strangers", then there would be a separate machine learning computer model for each of these different cohorts or affinity groups. The differing levels of security/privacy may be implemented by specifying different features to be anonymized or obfuscated for the different cohorts or affinity groups. For example, differing numbers of features that are to be anonymized for each of the affinity groups, with affinity groups representing less affinity with the operator having greater numbers of features to be anonymized or obfuscated when rendering the operator's avatar in the virtual environment for presentation to those other users.

The training of the machine learning computer model may be performed with regard to a set of static data for a plurality of users, e.g., static data specifying which cohort group the user belongs to, such as race, ethnicity, company affiliation, etc. The machine learning computer model may comprise a generative adversarial network (GAN), for example, which is trained to generate modified feature data for an operator which is used to represent the operator's avatar. In performing such training, the GAN is trained on feature inputs from two or more users, with noise being added to the input feature data until the features of the two or more users cannot be discriminated by the discriminator of the GAN (a GAN comprises a generator that generates a feature data stream, and a discriminator that attempts to classify the feature data stream as to whether it is a real or fake feature data stream, or whether one user is the same as another user in the present case). Once the discriminator cannot properly identify the input so as to discriminate between the two or more users, then the generator has been trained to add sufficient obfuscation to its inputs to render the resulting feature data stream such that it cannot be used to accurately identify the original user corresponding to the input features that are input to the generator. The resulting trained generator, which is a neural network, can then be used on new feature data to modify the feature data such that it is not uniquely identifiable of the user with which it is associated.

With regard to the dynamic schemes, these schemes operate on time series data representing movements or micromovements of an operator, such as may be detected by operator worn sensors, user manipulations of user input devices, image capture and analysis mechanisms detecting eye gaze direction, facial expressions and features, walking gait, stance, and/or body movements and micromovements, for example. In a first approach, the dynamic scheme involves obtaining the time series of data and removing higher frequencies from the time series of data, e.g., higher frequency micro movements data. Such higher frequency micromovements represent micro-movements that occur more often over time and thus, are more likely to be personally identifiable of the operator. By removing the higher frequency micro movements, the remaining data is less identifiable of the operator and thus, more anonymized or obfuscated. The elimination of higher frequency micromovement data can be performed along each of a plurality of dimensions of such captured time series data. The distinction between high frequency micromovement data and other relatively lower frequency micromovement data may be made based on one or more pre-defined thresholds, e.g., a threshold specifying that micromovement data occurring equal to or more than a predetermined amount of times within a given time interval are considered high or higher frequency time series data while other data below the threshold are not high or higher frequency time series data.

In a second approach to implementing the dynamic scheme of anonymizing or obfuscating operator characteristic or feature data, rather than removing the higher frequency time series data for a single operator, the illustrative embodiments may collect higher frequency time series data for a plurality of users and use the collected higher frequency time series data to generate an aggregate time series data that is injected into the operator's time series data to thereby modify the operator's time series data and thus, the resulting features or characteristics used to render the operator's avatar. The injection of these aggregated time series data for specific features or characteristics, e.g., movement or micromovement features or characteristics, mixes the aggregate features or characteristics with the operator's features or characteristics. This obfuscates or anonymizes those features and characteristics which are then used to render the operator's avatar such that the avatar and the motions of the avatar cannot be used to uniquely identify the operator. In this approach, again, thresholds may be predetermined for determining which time series data are higher frequency and which are not. Hereafter, for purposes of the following description, the time series data used to represent dynamic data, such as movements or micromovements, that is used to render an operator's avatar in a virtual environment will be referred to as the features that are input to the corresponding machine learning computer model. Thus, features of different users are the data that are used as input for rendering an avatar of that user in the virtual environment.

In the approaches to the dynamic schemes, it should be appreciated that the removal of higher frequency time series data and the injection of aggregated higher frequency time series data may be performed with regard to a selected set of features. That is, the time series of data may have multiple dimensions, each dimension corresponding to different features that may be used as input for rendering an avatar in the virtual environment. A select set or subset of these features may be determined as features for obfuscation or anonymization by way of one or more of the approaches to the dynamic scheme. The particular set or subset of features may be determined based on the cohort or affinity group that the other user is in relative to the operator, e.g., whether the other user is in the "friend", "family", "work", "stranger", or other affinity group/cohort of the particular operator. The static and dynamic schemes for anonymization and obfuscation may be applied to the set or subset of features based on the particular cohort or affinity group that a user belongs to such that there may be differently rendered avatars for different cohorts or affinity groups, i.e., the operator has a multiplicity of avatars representing the operator in the virtual environment. For those users that have high affiliation, original aesthetic feature representations and movements/micromovements may be represented when rendering the operator's avatar. For those users that do not have high affiliation, based on the level of affiliation to the operator, differently levels of modified aesthetic features and movement/micromovement feature based representations may be generated through the static and dynamic schemes discussed above so as to make the operator less uniquely identifiable for different cohorts/affinity groups. As a result, the security and privacy of operators is improved in virtual environments by making the representations of avatars less uniquely identifiable of their operators to other users that have lower levels of affinity with the operator.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a security and privacy based avatar customization mechanism that operates to perform customized anonymization or obfuscation of features used to render avatars, based on operator affinity with other users and/or operator specified profile data indicating operator preferences for anonymization and obfuscation. The improved computing tool implements mechanism and functionality, such as the security and privacy based avatar customization (SPAC) engine described hereafter, which cannot be practically performed by human beings either outside of, or with the assistance of, a technical environment, such as a mental process or the like. The improved computing tool provides a practical application of the methodology at least in that the improved computing tool is able to modify the way in which virtual avatars in virtual environments are renders so as to protect operator identities from being discerned from the appearance and movement/micromovement of the virtual avatar.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as security and privacy based avatar customization (SPAC) engine 200. In addition to SPAC engine 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a security and privacy based avatar customization (SPAC) engine 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates customized rendering of virtual avatars within virtual environments such that the protect the unique identifies of the operators associated with the virtual avatars, where this customization may be different depending on the affinity of the operator with the particular users interacting with the operator's virtual avatar.

As noted above, the illustrative embodiments provide mechanisms in an improved computing tool that operate to customize the rendering and presentation of an operator's avatar, not only with regard to static characteristics, e.g., appearance, but also with regard to dynamic characteristics, such as motions and micromotions of the operator. For example, a user of a first end user device, e.g., user device 103 in FIG. 1, may be an operator of an avatar in a virtual environment, e.g., a virtual environment of a video game, a virtualized work or other collaboration environment, a virtual electronic marketplace, or the like, as may be provided by computer 101 or remote server 104, for example. The SPAC engine 200 of the computer 101 may operate and interface with the virtual environment to modify characteristics of the operator's avatar within that virtual environment in accordance with one or more of the illustrative embodiments described herein. This may involve presenting different versions of the operator's avatar to different other users of other end user devices (not shown) who may be interacting with the same virtual environment as the operator and who may be perceiving the operator's avatar within that virtual environment through their end user devices. Different other users will be presented with different versions of the avatar based on security and privacy profiles of the operator and classifications of these other users with regard to affinity groups relative to the operator.

Figure 2:
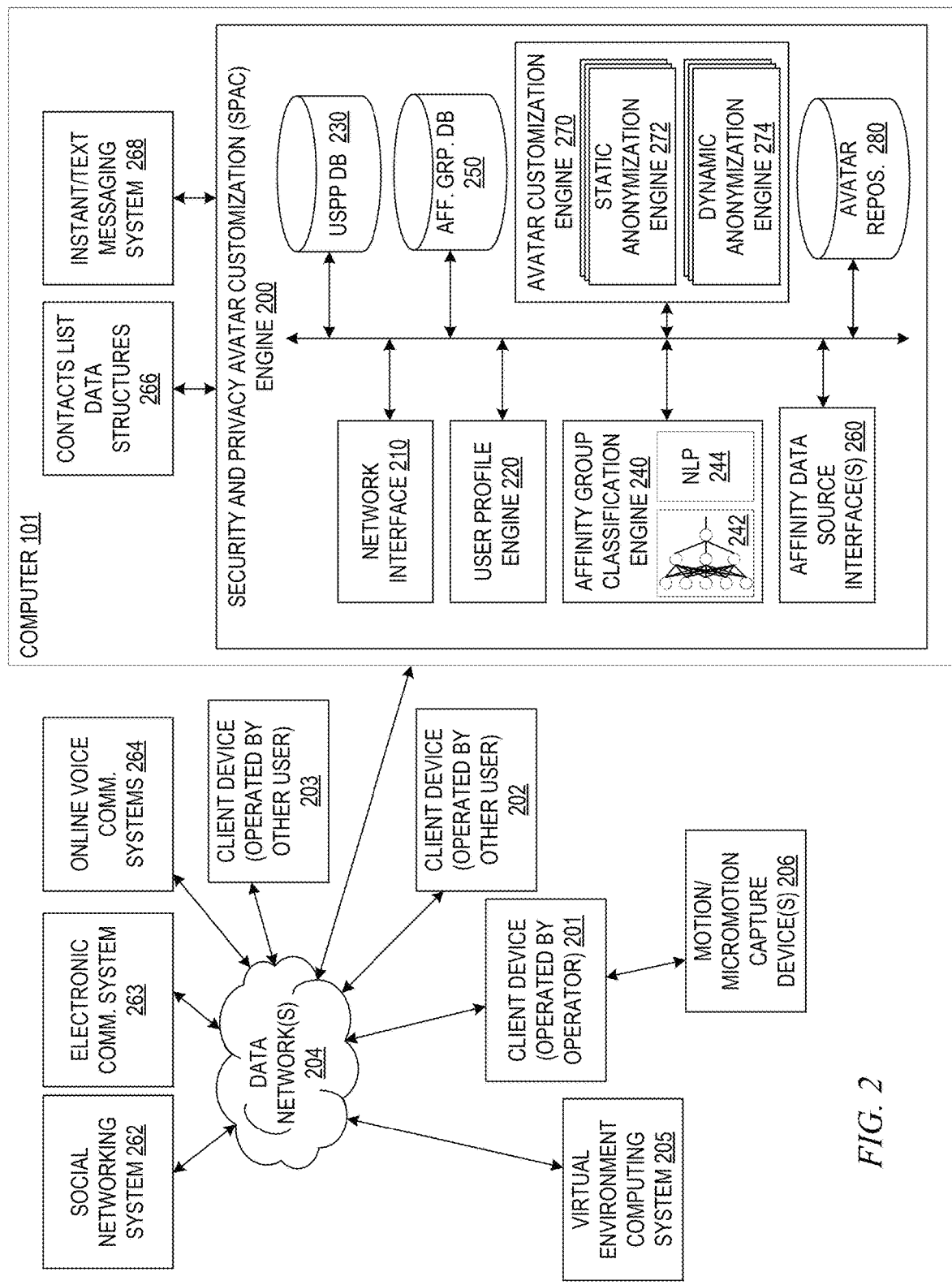
FIG. 2 is an example diagram of the primary operational components of a security and privacy based avatar customization (SPAC) engine in accordance with one illustrative embodiment.

FIG. 2 is an example diagram of the primary operational components of a security and privacy based avatar customization (SPAC) engine in accordance with one illustrative embodiment. The operational components shown in FIG. 2, as well as other block diagrams set forth hereafter, may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., user inputs to user interface devices, data collected from worn sensors, data from image capture devices focused on the user, and the like, and the resulting output may aid human beings, e.g., output of a customized virtual avatar within the virtual environment for interaction with other users. The invention is specifically directed to the automatically operating computer components directed to improving the way that the operator's avatar is rendered in the virtual environment so as to protect the security and privacy of the operator, which cannot be practically performed by human beings as a mental process and is not directed to organizing any human activity.

As shown in FIG. 2, the SPAC engine 200 includes a network interface 210, a user profile engine 220 which operates in conjunction with a user security and privacy profile (USPP) database 230, an affinity group classification engine 240 which operates in conjunction with an affinity group database 250 and interfaces 260 to one or more affinity data sources 262-268, and an avatar customization engine 270 which operates in conjunction with an avatar custom data repository 280. The avatar customization engine 270 comprises a static anonymization engine 272 and a dynamic anonymization engine 274. The static anonymization engine 272 comprises logic for applying anonymization data transformations to data used to render static characteristics of an operator's avatar in a virtual environment in accordance with user security and privacy policies and the classifications of affinity group of the other users. In some illustrative embodiments, this static anonymization engine 272 may comprise a trained generative adversarial network (GAN) that operates to anonymize the static characteristics of the operator's avatar. The dynamic anonymization engine 274 comprises logic for applying anonymization data transformations to data used to render dynamic characteristics of the operator's avatar in the virtual environment in accordance with the user security and privacy policies and the classifications of the affinity group of the other users. It should be appreciated that the data transformations affect the data streams going to the client devices 202-203 used by the other users such that they perceive the operator's avatar differently than a baseline avatar where no anonymization is performed. As a result, different users may perceive the operator's avatar differently via the client computing devices 202-203 because they are receiving a modified data stream having data for the operator's avatar that is transformed from the baseline data representation of the operator's avatar.

It should be appreciated that the components 210-280 may further operate in conjunction with each other via various data communication interfaces and other logic orchestrating the operations of these components 210-280 so as to perform the overall function of the illustrative embodiments with regard to customization of operator avatars based on security and privacy profiles and affinity group classifications of other users. The SPAC engine 200 operates in conjunction with client devices 201-203 and virtual environment computing system 205 via one or more data networks 204. Moreover, the SPAC engine 200 operates with remotely located affinity data source computing systems 262-264 via these one or more data networks 204. Locally, the SPAC engine 200 may also comprise interfaces and logic for accessing locally stored data in a same computing system or computing device, such as computer 101, on which the SPAC engine 200 is provided, such as affinity data sources 266-268.

It should be appreciated that while FIG. 2 shows elements as being separate elements for ease of explanation hereafter, one or more of these elements may be integrated with one another without departing from the spirit and scope of the present invention. For example, the SPAC engine 200, in some illustrative embodiments, may be integrated with the virtual environment computing system 205 or a client device 201. For example, in some illustrative embodiments, the client devices 201-203 may execute client components of a virtual environment application, which operates with a server component of the virtual environment application, and the SPAC engine 200 may be integrated with or interface with the client component of the virtual environment application or the server component of the virtual environment application on the corresponding computing devices 201-203 or 205. Similarly, the affinity data source computing systems 262-264 may be integrated with computer 101. Various combinations and configurations are possible, each of which are intended to be within the spirit and scope of the present invention.

The client computing devices 201-203 are clients to a virtual environment computing system 205 and provide a means by which users of these client computing devices 201-203 may access and interact with a virtual environment provided by the virtual environment computing system 205. For example, the virtual environment computing system 205 may be a server, group of servers, or the like, which a user of a client device 201-203 logs onto remotely via the data network(s) 204 to then interact with the virtual environment to engage in gaming, work, electronic commerce, or the like. For example, in some cases, the virtual environment may be a massively multiplayer online (MMO) video game in which the operator of client device 201 is represented as an avatar in a virtual environment through which the operator interacts with avatars of other users of other client devices 202-203 to engage in an online game. In other instances, the virtual environment may be a virtual work environment, e.g., conference room, where the operator of client device 201 may again be represented by an avatar and interacts with other users via their avatars in the same virtual work environment to conduct business or collaborations to advance a work related project.

One or more of the client devices 201-203, e.g., client device 201, may provide motion/micromotion capture device(s) 206 for capturing movements and micromovements of a corresponding user. These capture device(s) 206 may take many different forms from the traditional computer interface devices, e.g., computer mouse, touchpad, trackball, keyboard, or the like, to more advance sensors and apparatus, such as user worn or held motion detectors, image capture and recognition devices, and the like. The motions/micromotions that are captured by the capture devices 206 may be used as input to a client component and/or server component of the virtual environment computing system 205 for representing the user in the virtual environment with regard to mirroring the motions/micromotions being performed by the user's avatar in the virtual environment. Thus, movements by the user may be represented in the virtual environment as similar movements by the user's avatar. As noted previously, this may allow other users and other computing systems to be able to uniquely identify the user from the motions and micromotions performed by their avatar in the virtual environment, as these motions and micromotions may mirror the user's motions and micromotions (motions and micromotions are equivalent to movements and micromovements herein).

The SPAC engine 200 comprises a user profile engine 220 which operates with the USPP database 230 to store and retrieve data specific to particular users that access a virtual environment of the virtual environment computing system 205. It should be appreciated that there may be multiple different USPP databases 230 for different virtual environments, with each USPP database 230 storing user profiles for the specific users of those different virtual environments. The user profiles in the USPP database 230 may comprise standard use profile information, e.g., account information, password information, billing information, and the like. With particular importance to the illustrative embodiments, the USPP database 230 further comprises user profile information specifying settings and preferences of users with regard to security and privacy of their user identity, and specifically with regard to the static and dynamic characteristics of a user's avatar as presented to other users associated with various affinity group classifications. For example, the settings and preferences may specify which affinity group classifications for which varying levels of anonymization or obfuscation of static and/or dynamic characteristics are to be performed. As one example, a user may specify that for affinity group classifications of friends, family, and co-workers, no anonymization is required, but for users falling into an affinity group of acquaintances, dynamic characteristics are to be anonymized, and for users falling into an affinity group of strangers, both static and dynamic characteristics are to be anonymized or obfuscated.

Consider an example of a static feature such as company affiliation, e.g., International Business Machines (IBM). The operator, in his/her profile selects that this feature should not be used for anonymization in creating the operator's avatar for users from the same company. As a result, a generated avatar shows an IBM logo for all IBM users of the virtual environment, however a different generated avatar does not show the IBM logo for other users that are not affiliated with the company. For example, in one illustrative embodiment, for each feature in the user (operator) profile, there may be provided selectable settings with various choices, e.g., "everyone", "friends only", "co-workers", etc. that can be selected. Depending on the selection choice, the feature is used or not used for anonymization for that affinity group, thereby enabling multiple different avatars of the same operator for multiple different affinity groups.

Thus, the customization of the representation of operator avatars to other users may be achieved by encoding multiple levels of static and dynamic obfuscation/anonymization security/privacy setting information associated with the operator, where these levels can be associated with different classifications of other users, e.g., different affinity groups or cohorts of other users. In some illustrative embodiments, these different levels of static/dynamic obfuscation/anonymization may be established by setting different user (operator) selectable settings in a corresponding profile to enable/disable anonymization/obfuscation of corresponding features with regard to specific affinity groups. The different levels of operator security/privacy setting information for the various affinity group classifications may be used to render different representations of avatars in the virtual environment through data transformations of the data streams going to other users' computing devices that are in the virtual vicinity of the operator's avatar so as to present a different representation of the avatar to different users in different affinity groups. Thus, for example, the data stream to client device 202 may be modified to present the operator's avatar with anonymized static characteristics while the data stream to client device 203 may be modified to present the operator's avatar with anonymized static and dynamic characteristics. In this way, a multiplicity of avatars for the operator may be generated and used to represent the operator to other users.

As mentioned above, the security and privacy setting information in the USPP database 230 for the operator of the avatar can specify different levels of security or privacy to apply to the rendering of the operator's avatar based on the affinity groups or cohorts of other users. Thus, for an operator of a client device 201, the corresponding USPP entries from the USPP database 230 may be retrieved by the user profile engine 220. The user profile engine 220 may further provide any necessary graphical user interfaces through which the operator, as well as other users, can edit and modify their corresponding user profiles and security and privacy setting information in the entries of the USPP database 230. The security and privacy setting information in the entries in the USPP database 230 comprises at least a mapping between affinity groups or cohorts and corresponding anonymizations or obfuscations that are to be performed on avatar characteristics when presenting the avatar to users classified into these affinity groups or cohorts.

The affinity group classification engine 240 comprises logic that operates on data from various affinity data source systems 262-268, and in some cases user specifications of affinity groups/cohorts for specific users as specified in the affinity group database 250, to determine classifications of affinity groups for various users of the virtual environment computing system 205. For example, as a default, all users of a virtual environment computing system 205 may be initially set to a "stranger" affinity group/cohort classification and thus, the corresponding security and privacy settings of an operator for this "stranger" affinity group may be applied when representing the operator's avatar to these other users. The default setting may then be modified by the affinity group classification engine 240 based on user specifications and processing of affinity data from the various affinity data sources systems 262-268.

As shown in FIG. 2, the affinity data source systems 262-268 may comprise remote and local systems. The remote systems may be affinity data source systems 262-264 providing online, crowd source, or cloud based services that the operator may utilize, and through which have interactions with other users. The local systems may be affinity data source systems 262-264 that are associated with applications local to the SPAC engine 200 and which may store logs of communications and data structures specifying different levels of interactions between an operator and other users, e.g., contacts data structures, friend listing data structures, and the like.

The affinity group classification engine 240 may analyze affinity data obtained from these various sources 262-268, as well as virtual environment computing system 205, to classify users into affinity groups relative to an operator and store the affinity group membership information in the affinity group database 250 in association with an identifier of the operator. In classifying users into affinity groups or cohorts, the affinity group classification engine 240 may make use of one or more trained machine learning computer models 242, natural language processing (NLP) logic 244, and other logic to analyze affinity data from the various source systems 262-268 and generate a classification for a user. The particular affinity data operated on is specific to the operator. For example, specific electronic communications by and with the operator, specific contact list data structures for the operator, specific friends listings associated with the operator, specific co-worker information from organization employee data structures, and the like. The contact lists, friends lists, co-worker listings, and the like, may be used to correlate the identities of these other individuals with users of the virtual environment computing system 205 by correlating such identities from these lists with user profile information for the virtual environment, e.g., John Smith is listed as a friend in social network A and John Smith is a user of the virtual environment computing system 205 having a user identifier of "jsmith024".

For electronic communications, e.g., posts, instant messages, texts, recordings of voice communications, and the like, the content of the communications may be processed by the NLP logic 244 to extract natural language features, e.g., key words, phrases, and the like, which may be indicative of a level of affinity between the operator and these other individuals/users. These features may be input to one or more trained machine learning computer models 242 for classifying the individuals/users as to their level of affinity with the operator. That is, the natural language features extracted from the natural language content of the electronic communications may be encoded as input vectors to the trained machine learning computer models 242, which may be trained based on training data of similar natural language feature vectors representing different patterns of natural language features and ground truth data specifying an affinity group or cohort corresponding to the individual/user. The machine learning computer model 242 may be trained using linear regression or other machine learning algorithms to predict a classification of affinity group/cohort membership for a user based on the input pattern of natural language features. The trained machine learning computer model 242, when presented with a new input vector then operates on the input vector to classify the individual as to which affinity group/cohort the individual should be associated with for a particular operator. It should be appreciated that the machine learning model(s) 242 may further operate on contact list data structure features, friends listing data structure features, and the like, in addition to the natural language features so as to take into consideration all affinity data available when determining which level of affinity a particular individual/user has with the operator.

As shown in FIG. 2, the affinity data source systems 262-268 may include a social networking system 262 from which user contact lists, friends lists, and specific communications posted by the operator and directed to the operator may be obtained. The affinity data source systems may also include an electronic communication system 263, such as an email system, through which the operator may send and receive electronic communications to other individuals/users. These electronic communications may be processed using the NLP 244 and machine learning model(s) 242 as previously mentioned above.

The affinity data source systems 262-268 may further include online voice communication systems 264, such as voice-over-IP (VOIP) systems and other online systems that support voice communication, such as Discord® (a registered trademark of Discord Inc. of San Francisco, California) or the like. The voice communications may be recorded and converted to text which may then be analyzed using the NLP logic 244 and machine learning computer model(s) 242. As with the other source systems 262-268, any contact lists, friends lists, or other indicators of affinity may also be analyzed from this source system 263 to thereby determine an affinity classification for users relative to the operator.

The contact list data structures 266 and instant/text messaging system 268 that are local to the SPAC engine 200 may likewise have their listings and communications analyzed by the affinity group classification engine 240 to thereby classify individuals/users with regard to their affinity to the operator. It should be appreciated that the same individual/user may be represented in two or more of these source systems 262-268 and thus, affinity data from multiple different sources may be used to classify the individual/user with regard to their affinity group/cohort.

In addition to the automated analysis of affinity data from the various affinity data source systems 262-268, user specifications of affinity group membership may also, or alternatively, used to identify which affinity groups or cohorts a user is classified in relative to the operator. For example, the operator may specify a level of affinity for particular other users, such as "Joe Smith" is my "Friend", where "Friend" is an affinity group (or cohort) and "Joe Smith" is a specific other user. Thus, the operator may specify specific affinities of specific other users and these specifications of affinities may be used as an override of any automatically generated classification of users into affinity groups or cohorts.

It should be appreciated that some static information, such as company affiliation, age, gender, etc. may automatically define membership of users with certain defined operator affinity groups. Dynamic features, such as head/hand movements data or the like, do not automatically define affinity groups, but the operator sees these dynamic features as categories of features in his/her profile with corresponding settings for turning on/off anonymization/obfuscation against a set of pre-defined affinity groups, e.g., turn on for group A and turn off for group B.

Thus, for users of the virtual environment computing system 205, each user may be individually regarded as an operator and the classification of other users of the virtual environment computing system 205 relative to the operator may be performed by the affinity group classification engine 240. This results in different affinity group memberships of different users for each operator. These affinity groupings and memberships may be stored in the affinity group database 250 in association with operator identifiers. Similarly, each operator may have their own user security and privacy policy (USPP) entries in the USPP database 230 that specifies different anonymizations to perform with regard to each of the different affinity groupings. Thus, when an operator is using the virtual environment computing system 205, the operator identifier may be used by the user profile engine 220 to retrieve the corresponding USPP entries from the USPP database 230. Moreover, the affinity grouping information from the affinity group database 250 for the operator may be retrieved. These entries together specify, for which other users, the particular anonymizations to be applied to the avatar static and dynamic characteristics when rendering the operator's avatar in data streams to the client devices 202-203 of the other users, e.g., John Smith is an acquaintance as indicated in the affinity group information 250 and should have the avatar static characteristics anonymized as indicated by the USPP database 230 entry for the operator.

Thus, different levels of obfuscation of the operator's identity may be performed for different affinity groups/cohorts of other users. For those other users classified into a cohort with which the operator has a high level of affiliation, e.g., work groups in the operator's own company, family members, etc., the rendering of the avatar may be presented with no obfuscation, i.e., full static and dynamic characteristics being represented in the presentation of the avatar to these other users such that those users can uniquely identify the operator. For those other users classified into a cohort with which the operator has a no or a minimal level of affiliation, e.g., users associated with a different company, a high level of obfuscation may be applied to the presentation of the operator's avatar such that these other users will not see the actual static and/or dynamic characteristics of the operator's avatar and be able to uniquely identify the operator.

With the mechanisms of the illustrative embodiments, different levels of operator information are available to various affinity groups or cohorts of other users and these different levels of operator information are used to customize the presentation of the operator's avatar to those other users according to their affinity group or cohort. As a result, varying degrees of personally identifiable characteristics of the operator that are represented in the rendering of the operator's avatar are made possible both with regard to the static and dynamic characteristics of the operator's avatar, e.g., motions or micromotions performed by the operator which are captured by the motion/micromotion capture devices 206 which are then mirrored in the representation of the operator's avatar.

The obfuscation of the personally identifiable information, e.g., static and/or dynamic characteristics of the user used to render static and dynamic characteristics of the avatar, may be implemented by the avatar customization engine 270 in different ways by using one or more of static and dynamic obfuscation schemes. As mentioned previously, static schemes use operator information that does not change in time or which do not change often in time, such as which cohort groups the operator belongs to (e.g., race, gender, ethnicity, company affiliation, age, etc.). Dynamic schemes use time-series information, such as movements and micromovements of the operator, during a virtual environment session. These static and dynamic schemes may be used to make the operator less identifiable to other users who have less affinity to the operator, and to make the operator more identifiable to other users that have a greater level of affinity to the operator.

The one or more static and/or dynamic schemes for customizing a level of security/privacy of operator personally identifiable information represented in the representation of an avatar in the virtual environment may be applied by the static anonymization engine 272 and dynamic anonymization engine 274 automatically and dynamically when the operator is interacting with the virtual environment computing system 205 and relative to the other users that are determined to be within a virtual vicinity of the operator's avatar in the virtual environment, i.e., the subset of users in the virtual environment that are able to perceive the operator's avatar.

In one illustrative embodiment, the static scheme for avatar security/privacy implemented by the static anonymization engine 272 involves the training of a machine learning computer model, e.g., a neural network, to anonymize characteristics or "features" of the avatar. There may be a differently trained machine learning computer model for each defined affinity group or cohort of other users, e.g., if there are cohorts for "work", "family", "friends", "acquaintances", and "strangers", then there may be a separate machine learning computer model for each of these different cohorts or affinity groups. The differing levels of security/privacy may be implemented by specifying different features to be anonymized or obfuscated for the different cohorts or affinity groups. For example, differing numbers of features that are to be anonymized for each of the affinity groups, with affinity groups representing less affinity with the operator having greater numbers of features to be anonymized or obfuscated when rendering the operator's avatar in the virtual environment for presentation to those other users.

The training of the machine learning computer model may be performed with regard to a set of static data for a plurality of users, e.g., static data specifying the user's race, ethnicity, company affiliation, etc. The machine learning computer model of the static anonymization engine 272 may comprise a generative adversarial network (GAN), for example, which is trained to generate modified feature data for an operator which is used to represent the operator's avatar. In performing such training, the GAN is trained on feature inputs from two or more users, with noise being added to the input feature data until the features of the two or more users cannot be discriminated by the discriminator of the GAN (a GAN comprises a generator that generates a feature data stream, and a discriminator that attempts to classify the feature data stream as to whether it is a real or fake feature data stream, or whether one user is the same as another user in the present case). Once the discriminator cannot properly identify the input so as to discriminate between the two or more users, then the generator has been trained to add sufficient obfuscation to its inputs to render the resulting feature data stream such that it cannot be used to accurately identify the original user corresponding to the input features that are input to the generator. The resulting trained generator, which is a neural network, can then be used on new feature data to modify the feature data such that it is not uniquely identifiable of the user with which it is associated.

With regard to the dynamic schemes implemented by the dynamic anonymization engine 274, these schemes operate on time series data representing movements or micromovements of an operator, such as may be detected by the motion/micromotion capture device(s) 206. In a first approach, the dynamic scheme of one or more of the instances of the dynamic anonymization engine 274 involves obtaining the time series of data and removing higher frequencies from the time series of data, e.g., higher frequency micro movements data. Such higher frequency micromovements represent micro-movements that occur more often over time and thus, are more likely to be personally identifiable of the operator. By removing the higher frequency micro movements, the remaining data is less identifiable of the operator and thus, more anonymized or obfuscated. The elimination of higher frequency micromovement data can be performed along each of a plurality of dimensions of such captured time series data. The distinction between high frequency micromovement data and other relatively lower frequency micromovement data may be made based on one or more pre-defined thresholds, e.g., a threshold specifying that micromovement data occurring equal to or more than a predetermined amount of times within a given time interval are considered high or higher frequency time series data while other data below the threshold are not high or higher frequency time series data.

In a second approach to implementing the dynamic scheme of anonymizing or obfuscating operator characteristic or feature data, which may be implemented by one or more instances of the dynamic anonymization engine 274, rather than removing the higher frequency time series data for a single operator, the illustrative embodiments may collect higher frequency time series data for a plurality of users and use the collected higher frequency time series data to generate an aggregate time series data that is injected into the operator's time series data to thereby modify the operator's time series data and thus, the resulting features or characteristics used to render the operator's avatar. The injection of these aggregated time series data for specific features or characteristics, e.g., movement or micromovement features or characteristics, mixes the aggregate features or characteristics with the operator's features or characteristics. This obfuscates or anonymizes those features and characteristics which are then used to render the operator's avatar such that the avatar and the motions of the avatar cannot be used to uniquely identify the operator. In this approach, again, thresholds may be predetermined for determining which time series data are higher frequency and which are not.

In some the approaches to the dynamic schemes implemented by one or more instances of the dynamic anonymization engine 274, it should be appreciated that the removal of higher frequency time series data and the injection of aggregated higher frequency time series data may be performed with regard to a selected set of features. That is, the time series of data may have multiple dimensions, each dimension corresponding to different features that may be used as input for rendering an avatar in the virtual environment. A select set or subset of these features may be determined as features for obfuscation or anonymization by way of one or more of the approaches to the dynamic scheme. The particular set or subset of features may be determined based on the cohort or affinity group that the other user is in relative to the operator, e.g., whether the other user is in the "friend", "family", "work", "stranger", or other affinity group/cohort of the particular operator. The static and dynamic schemes for anonymization and obfuscation may be applied to the set or subset of features based on the particular cohort or affinity group that a user belongs to such that there may be differently rendered avatars for different cohorts or affinity groups, i.e., the operator has a multiplicity of avatars representing the operator in the virtual environment. For those users that have high affiliation, original aesthetic feature representations and movements/micromovements may be represented when rendering the operator's avatar. For those users that do not have high affiliation, based on the level of affiliation to the operator, different levels of modified aesthetic features and movement/micromovement feature based representations may be generated through the static and dynamic schemes discussed above so as to make the operator less uniquely identifiable for different cohorts/affinity groups. As a result, the security and privacy of operators is improved in virtual environments by making the representations of avatars less uniquely identifiable of their operators to other users that have lower levels of affinity with the operator.

The results of the application of the static anonymization schemes and dynamic anonymization schemes may result in particular modified static and dynamic characteristic settings for different users. These settings may be stored in the avatar repository 280 for later retrieval and application during the same operator session with the virtual environment computing system 205. In this way, the anonymizations may be determined by the avatar customization engine 270 and thereafter automatically applied without having to perform the same anonymization determination operations by the engines 272-274 again, thereby making the system more responsive.

The data transformations determined by the static anonymization engine 272 and/or dynamic anonymization engine 274, which may be stored in the avatar repository 280, may be automatically applied by the SPAC engine 200, and/or provided to the virtual environment computing system 205 for application, to data streams to the various client devices 202-203 to modify the representation of the operator's avatar, i.e., the operator of client device 201, on the client devices 202-203. That is, the server component of the virtual environment at the virtual environment computing system 205 may provide the data for representing the operator's avatar to the client components of the virtual environment at the client devices 202-203. The particular data provided by the server component will differ for the various users of client devices 202-203 based on their affinity with the operator of client device 201. Thus, the user of client device 202 may see a different operator avatar than the user of client device 203.

Figure 3:
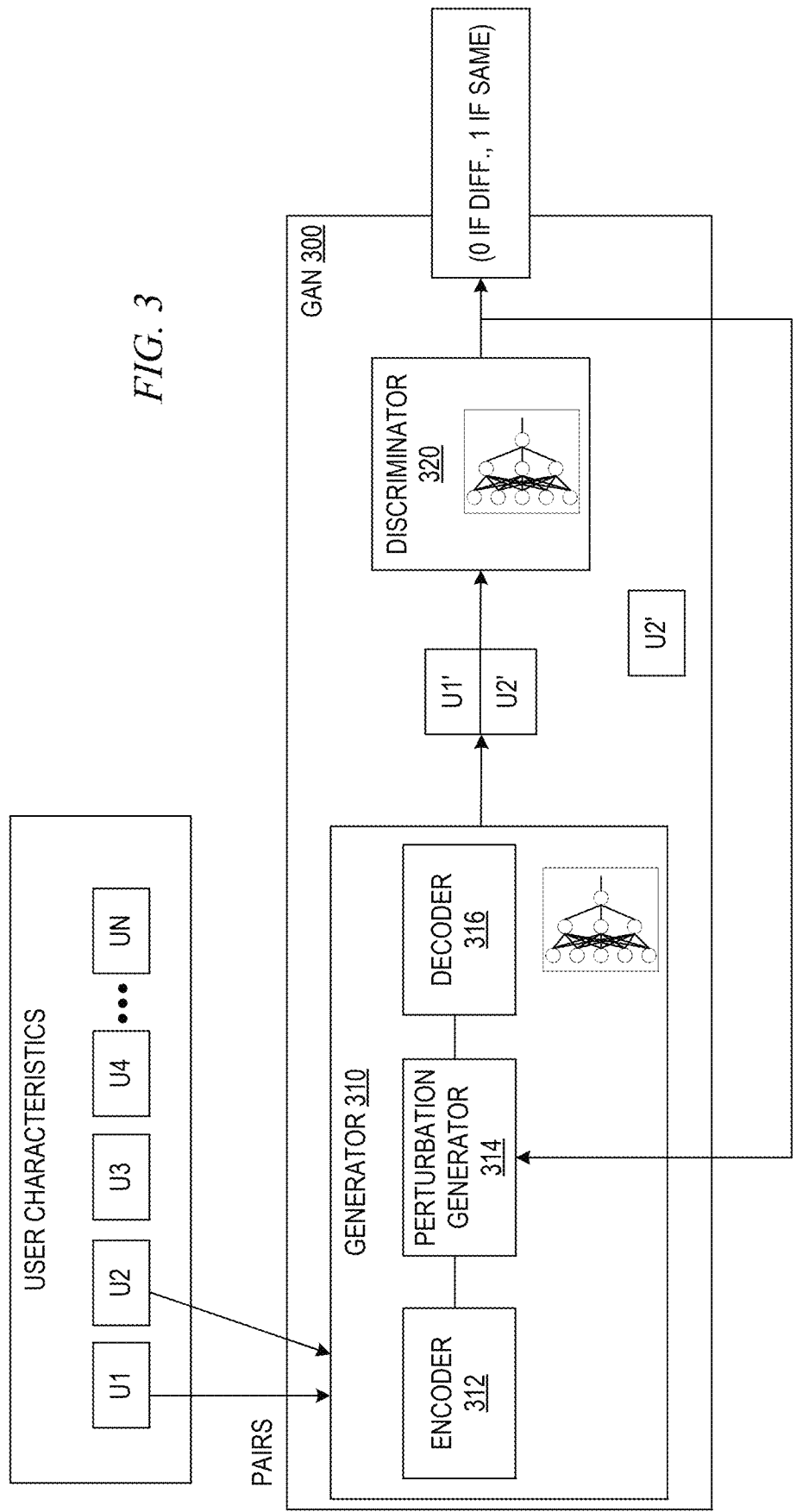
FIG. 3 is an example diagram of a generative adversarial network (GAN) based static anonymization engine in accordance with one illustrative embodiment.

As mentioned above, when anonymizing the operator information used to render the operator's avatar, the static anonymization engine 272 may implement a generative adversarial network which is trained to modify input data comprising the operator information to generate a modified operator information from which the operator cannot be uniquely identified. FIG. 3 is an example diagram of a generative adversarial network (GAN) based static anonymization engine in accordance with one illustrative embodiment.

As shown in FIG. 3, the GAN 300 includes a generator 310 and a discriminator 320. The generator 310 comprises an encoder 312, a perturbation generator 314, and a decoder 316. The generator 310 may be fed with inputs representing the static characteristics of two users U1 and U2, where the pairings of users may be performed over a set of N users with known static characteristics. The generator 310 encodes those static characteristics using the encoder 312, perturbs these encoded features, and then decodes these perturbed features to generate modified user static characteristics U1' and U2'. The discriminator 320 comprises logic to determine based on the inputs of the modified user static characteristics U1' and U2', whether the users are different (e.g., an output of 0) or the same (e.g., an output of 1).

In this way, the discriminator 320 is trained on pairs of users to learn whether users are the same or not and hence, learns how to differentiate users. The generator 310 is trained to create perturbations of features of each of the users to create fake user pairs. The generator 310 training is performed until the discriminator 320 is unable to correctly recognize differences in the perturbed user characteristics U1' and U2'. The resulting generator 310 is then able to be used to process new user static characteristics, such as those of the operator, to thereby modify the static characteristics such that the user cannot be distinguished from a fake user. That is, the static characteristics of the operator may be input to the generator which will then generate a modified set of static characteristics for the operator from which the unique identity of the operator cannot be distinguished. The modified static characteristics may then be used to generate the operator's avatar. It should be appreciated that the generator 310 may be a pre-trained auto-encoder or may utilized pre-trained foundation models, for example.

Figure 4:
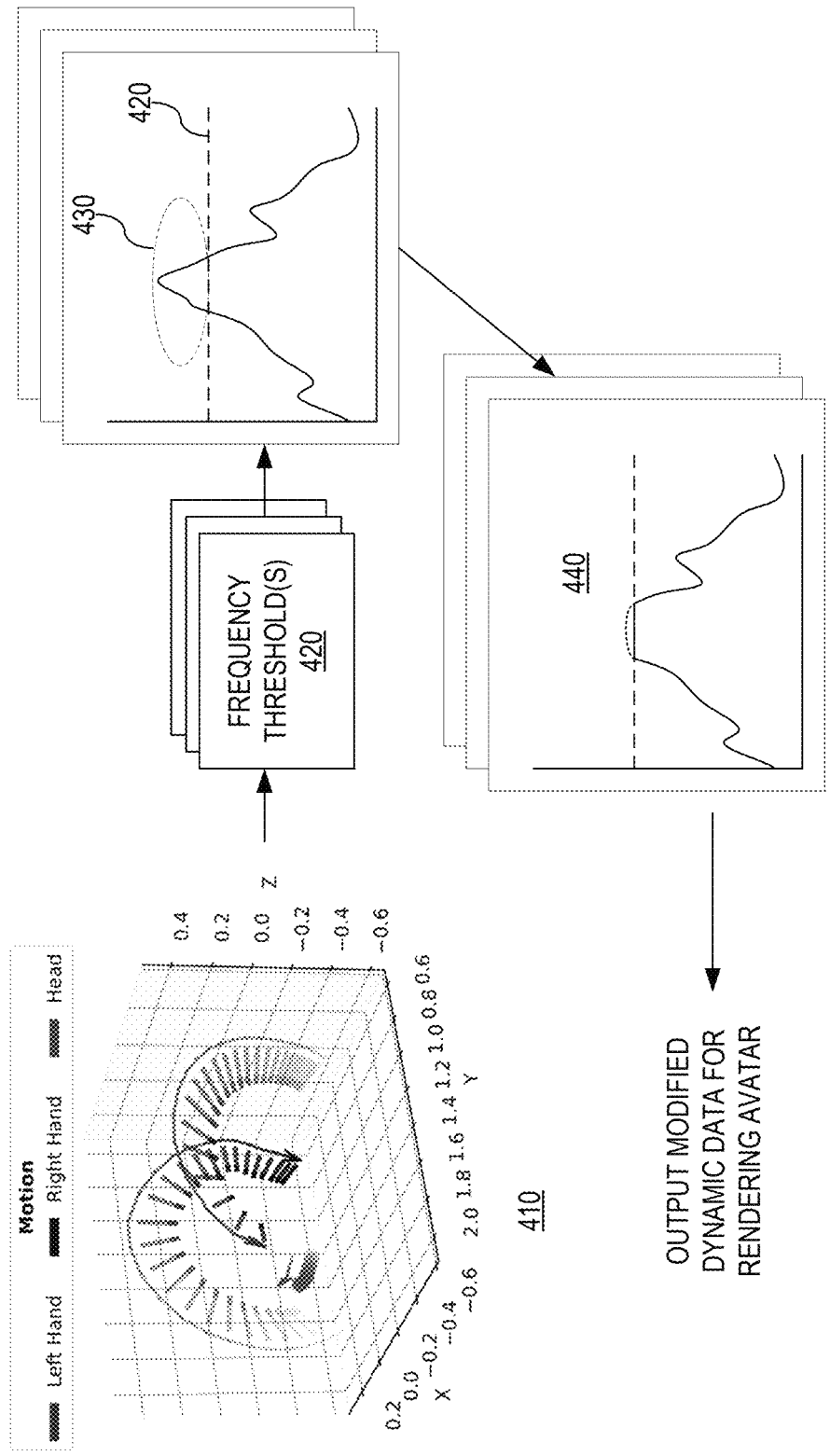
FIG. 4 is an example diagram of a time-series data dynamic anonymization engine in accordance with one illustrative embodiment.

FIG. 4 is an example diagram of a time-series data dynamic anonymization engine in accordance with one illustrative embodiment. In the example shown in FIG. 4, a time series of data 410 is received which comprises motion and/or micromotion data along multiple dimensions. This time series of data 410 may be obtained, for example, from a client device and/or a motion/micromotion capture device associated with the client device. For example, the time series of data may comprise motion data (telemetry) with various features captured at various time points, such as the position in the x, y, and z planes of the user/avatar relative to a reference, the rotation of the user/avatar's hands, the rotation of the user/avatar's head, etc.

Along each of the dimensions, e.g., physical position, hand motion, head motion, etc., a threshold frequency 420 is applied to remove portions 430 of the time series of data, i.e., portions of motion and micromotion data, having higher frequencies, i.e., frequencies of occurrence greater than the threshold frequency 420. By applying the threshold frequency 420 to the time series data, and removing the motion/micromotion data having a frequency of occurrence higher than the threshold 420, those motions and micromotions that occur most frequently in the representation of the avatar based on the captured motions/micromotions of the user are removed. These are the motions/micromotions that are most likely to be those indicative of the specific user as they happen most often. For example, if the user has a tendency to twitch their hand in a particular manner, those micromotions will occur more frequently than other micromotions and thus, will be more representative of the user. Removing such high frequency micromotions makes the user less likely to be uniquely identifiable from the representation of those micromotions when rendering the user's avatar.

The resulting modified time series of data 440 comprises the same time series of data with the high frequency data removed. The modified time series of data 440 is output for use in rendering the operator's avatar. When the operator's avatar is rendered, the high frequency motions/micromotions will not be rendered when rendering the avatar. In some cases, to avoid jerkiness or odd lack of movement, the portions of the time series of data 430 that are removed, may be replaced with standardized movements/micromovements for that dimension (illustrated in 440 as the dashed curve). For example, there may be standardized movement and/or micromovement data that may be fit within the range of the time series of data 410 where the portion 430 was removed by mapping the standardized time series of data into the range and a smoothing algorithm may be applied to smoothly transition from the actual time series of data to the standardized movement/micromovement data and then back again for that portion 430. In other illustrative embodiments, the smoothing algorithms may be applied to the remaining data of the time series of data after removal of the portion 430 such that the curve is smoothed in the area of the threshold 420.

Figure 5:
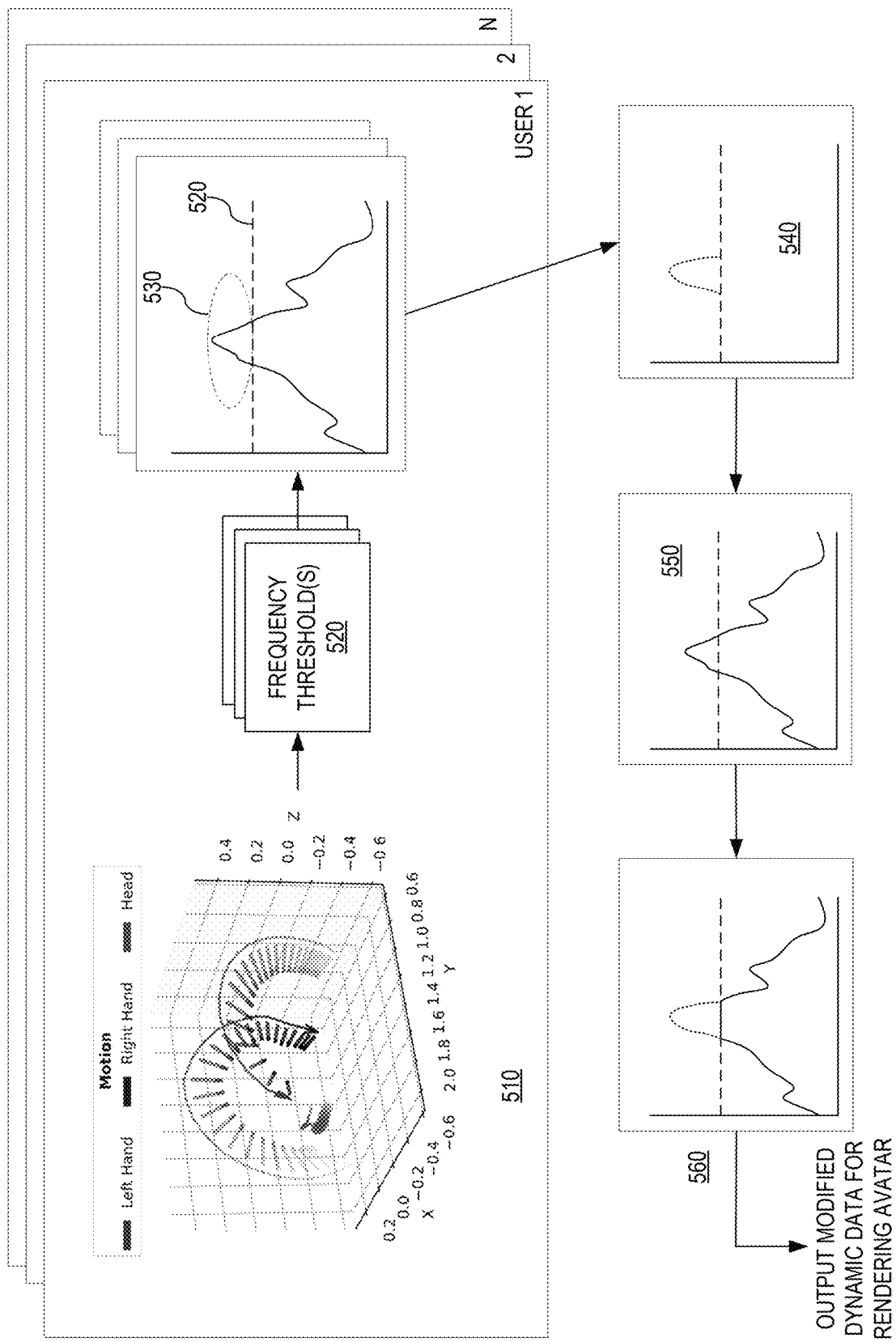
FIG. 5 is an example diagram of a time-series data dynamic anonymization engine in accordance with another illustrative embodiment.

FIG. 5 is an example diagram of a time-series data dynamic anonymization engine in accordance with another illustrative embodiment. In this second approach to time-series data dynamic anonymization, rather than removing the higher frequency time series data for a single operator, as in the first approach shown in FIG. 4, the illustrative embodiments may collect time series data 510 for a plurality of users 1 to N, applies frequency thresholds 520 to the time series data 510 to identify portions 530 of the time series data 510 that corresponding to the higher frequency motion/micromotion data. These higher frequency portions 530 are collected and used to generate an aggregate time series data 540 that is injected into the operator's time series data 550 to thereby modify the operator's time series data and thus, the resulting features or characteristics used to render the operator's avatar. The injection of these aggregated time series data 540 for specific features or characteristics, e.g., movement or micromovement features or characteristics, mixes the aggregate features or characteristics with the operator's features or characteristics. This obfuscates or anonymizes those features and characteristics to generate the mixed time series data 560. The mixed time series data 560 is then used to render the operator's avatar such that the avatar and the motions of the avatar cannot be used to uniquely identify the operator.

FIGS. 6-9 present flowcharts outlining example operations of elements of the present invention with regard to one or more illustrative embodiments. It should be appreciated that the operations outlined in FIGS. 6-9 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 6-9, and may, in some cases, make use of the results generated as a consequence of the operations set forth in FIGS. 6-9, the operations in FIGS. 6-9 themselves are specifically performed by the improved computing tool in an automated manner.

Figure 6:
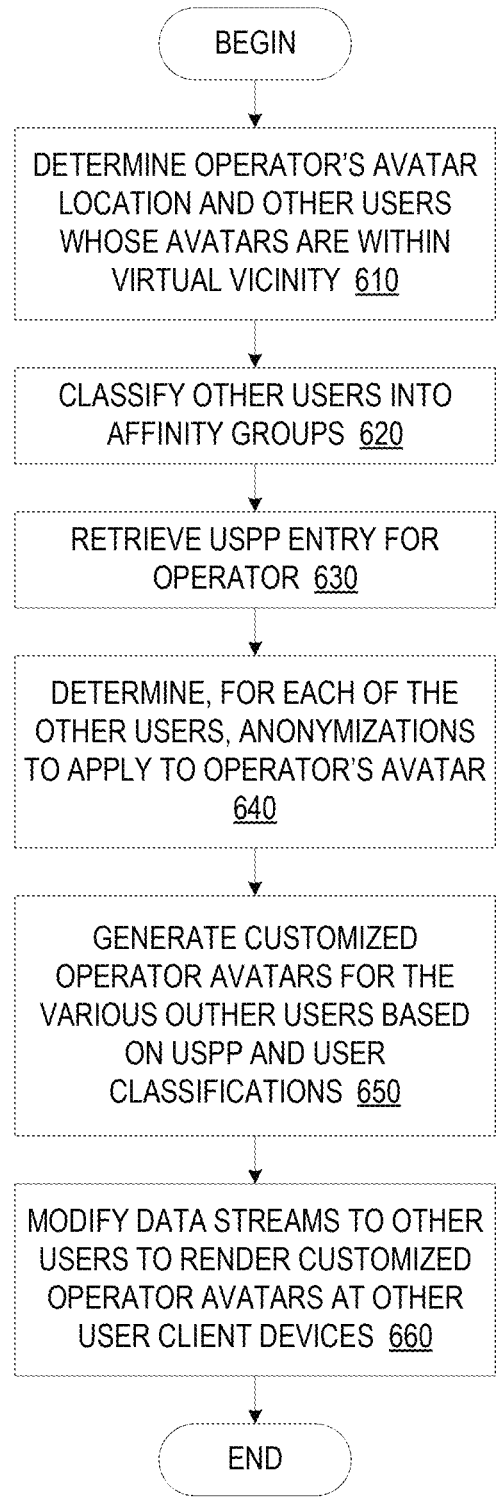
FIG. 6 is a flowchart outlining an example operation for customizing an avatar for anonymization of static and/or dynamic features of the operator in accordance with one illustrative embodiment.

FIG. 6 is a flowchart outlining an example operation for customizing an avatar for anonymization of static and/or dynamic features of the operator in accordance with one illustrative embodiment. As shown in FIG. 6, the operation starts by determining the operator's avatars location within the virtual environment and the other users who have their avatars within a virtual vicinity of the operator's avatar such that they are able to perceive the operator's avatar (step 610). For each of these other users, those users are classified into affinity groups relative to the operator, or the affinity group classification previously determined may be retrieved from data structures corresponding to the operator (step 620). In addition, the USPP entry for the operator is retrieved, where again the USPP entry specifies the security and privacy policies to apply to rendering of avatars for different affinity groups (step 630). Based on the USPP and the user classifications, anonymizations to apply to the rendering of the operator's avatar are determined for each of the other users (step 640). Based on these anonymizations, different customized operator avatars are generated, where different users may perceive different operator avatars as representing the operator, where these differences may be in terms of static and/or dynamic characteristics (step 650). Based on the different customized operator avatars, the data streams to the various users are modified such that the particular customized operator avatar associated with a user is represented in the data stream to that user's client device (step 660). The operation terminates, but may be repeated on a continuous or periodic basis.

Figure 7:
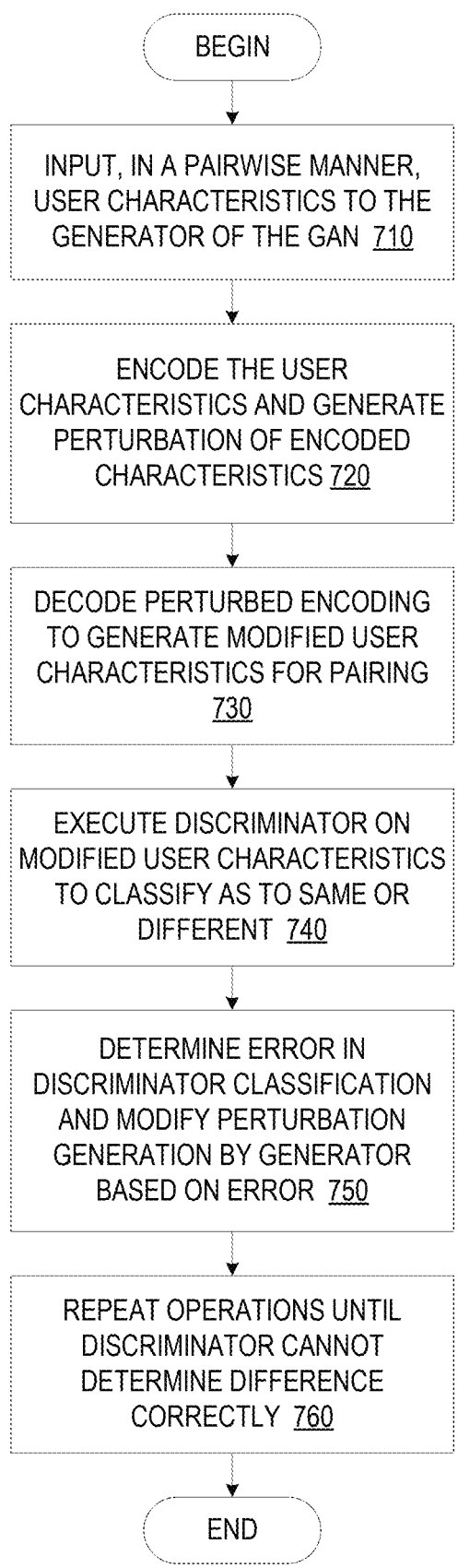
FIG. 7 is a flowchart outlining an example operation for GAN based static anonymization of features of an operator in accordance with one illustrative embodiment.

FIG. 7 is a flowchart outlining an example operation for GAN based static anonymization of features of an operator in accordance with one illustrative embodiment. As shown in FIG. 7, the operation starts by inputting, in a pairwise manner, user characteristics to the generator of the generative adversarial network (GAN) (step 710). The generator encodes the user characteristics and generates a perturbation of the encoded characteristics (step 720). The generator then decodes the perturbed encoding to generate modified user characteristics for the pairing (step 730). The discriminator is then executed on the modified user characteristics to classify the users as to whether they represent the same or different users (step 740). Based on the classification an error or loss is generated for the discriminator which is then used to modify operational parameters of the perturbation generation in the generator of the GAN (step 750). This operation is repeated until the discriminator can no longer correctly determine a difference between the two users (step 760). This process may be repeated for each pairing of users in a set of N users. Once the GAN is trained in this manner, the generator may then be used to encode operator static characteristics so that they are not distinguishable from other users.

Figures 8, 9:
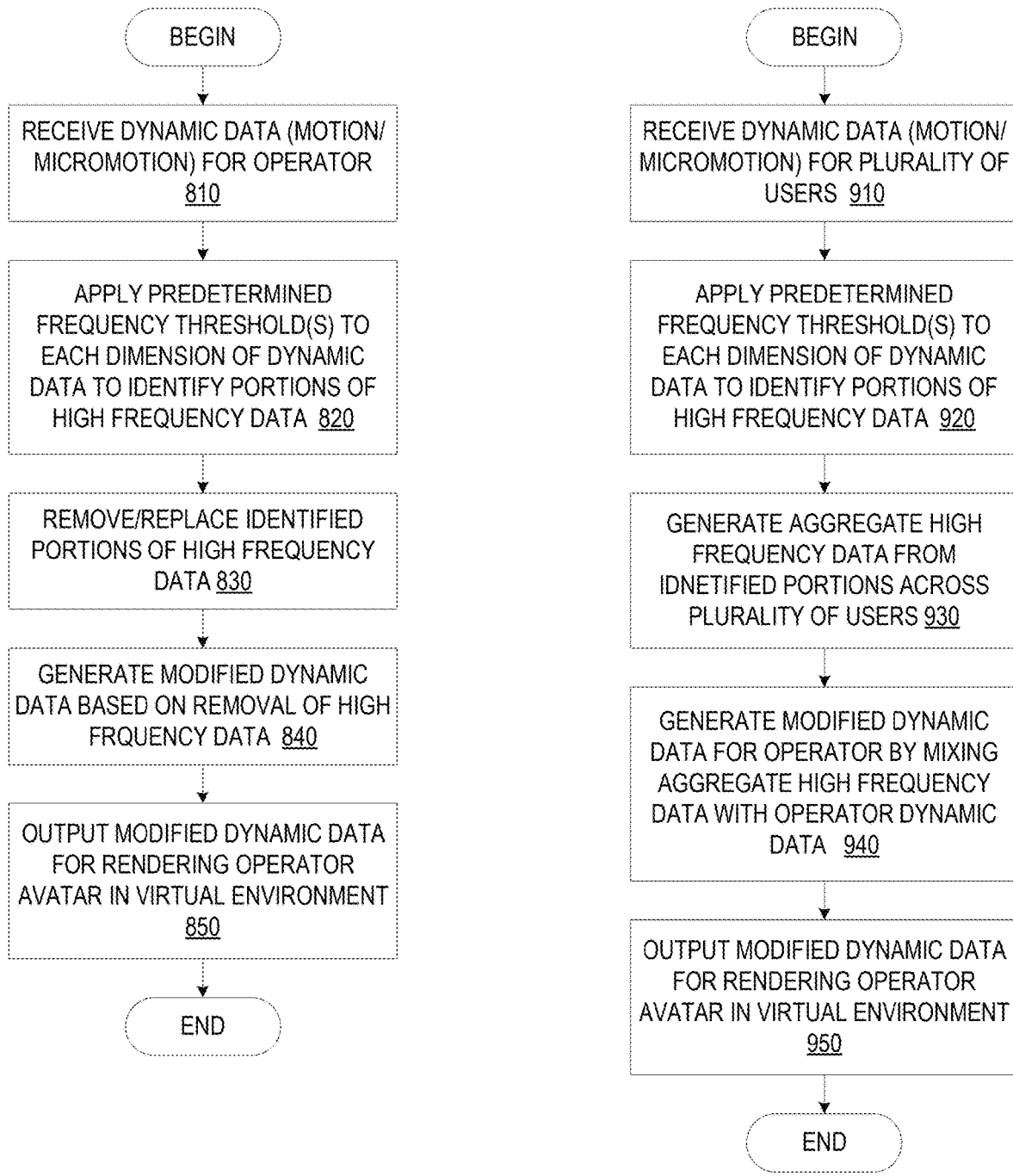
FIG. 8 is a flowchart outlining an example operation for a time-series data dynamic anonymization by removing high frequency data in accordance with one illustrative embodiment.
FIG. 9 is a flowchart outlining an example operation for a time-series data dynamic anonymization by injecting aggregated high frequency data in accordance with one illustrative embodiment.

FIG. 8 is a flowchart outlining an example operation for a time-series data dynamic anonymization by removing high frequency data in accordance with one illustrative embodiment. As shown in FIG. 8, the operation starts by receiving dynamic data (e.g., motion and/or micromotion data) for an operator (step 810). Frequency threshold(s) are applied to each dimension of the dynamic data to identify portions of the dynamic data that are high frequency data (step 820). The high frequency data portions are then removed and/or replaced (step 830). The removal/replacement is used to generate modified dynamic data, where this modified dynamic data may be smoothed or otherwise processed to remove any jittery or odd patterns of dynamic data (step 840). The modified dynamic data is then output for rendering the operator's avatar in the virtual environment (step 850). The operation then terminates but may be repeated continuously or periodically to perform dynamic anonymization of rendering the operator's avatar to the various other users.

FIG. 9 is a flowchart outlining an example operation for a time-series data dynamic anonymization by injecting aggregated high frequency data in accordance with one illustrative embodiment. As shown in FIG. 9, the operation starts by receiving dynamic data (e.g., motion and/or micromotion data) for a plurality of users, which may include the operator (step 910). Frequency threshold(s) are applied to each dimension of the dynamic data of each user to identify portions of the dynamic data that are high frequency data (step 920). The high frequency data portions are then used as a basis to generate an aggregate high frequency data across the plurality of users (step 930). The aggregate high frequency data is then mixed with the dynamic data for the operator to thereby generate modified dynamic data for the operator (step 940). The modified dynamic data is then output for rendering the operator's avatar in the virtual environment (step 950). The operation then terminates but may be repeated continuously or periodically to perform dynamic anonymization of rendering the operator's avatar to the various other users.

Thus, the illustrative embodiments provide an improved computing tool and improved computing tool functionality for providing multiple levels of security and privacy of an operator's identity with regard to the rendering of their avatar in a virtual environment. In this way, the operator's avatar may be customized to the particular security and privacy policies defined by the operator with regard to various affinity groups. Users are classified into these various affinity groups and then, when the operator's avatar is to be presented to the user in the virtual environment, the rendering of the operator's avatar is automatically modified based on the classification of the user into the affinity group and the particular security and privacy policies associated with that affinity group. As a result, different levels of exposure of the operator's static and dynamic characteristics may be made to different users based on their affinity to the operator.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for customizing an avatar in a virtual environment, the method comprising:

identifying a first user that is interacting with the virtual environment and to whom the avatar is to be rendered in the virtual environment;

determining a classification of the first user with regard to a plurality of affinity groups specifying a level of affinity between the first user and an operator of the avatar;

retrieving a first user security and privacy policy (USPP) data structure, associated with the operator, specifying security and privacy policies for each affinity group in the plurality of affinity groups, wherein at least two affinity groups have different security and privacy policies specified in the USPP data structure;

applying, based on the classification of the first user into an affinity group, and a security and privacy policy associated with the affinity group as specified in the USPP data structure, an anonymization operation to at least one of static or dynamic characteristics data for the operator which are used to render the avatar, to thereby generate anonymized characteristic data; and outputting the anonymized characteristic data for rendering the avatar in the virtual environment, wherein the avatar is rendered as a first avatar that has avatar characteristics corresponding to the anonymized versions of the at least one static or dynamic characteristics data, wherein applying the anonymization operation comprises:
inputting the one of static or dynamic characteristics data for the operator which are used to render the avatar into a trained generator of a trained generative adversarial network (GAN); and processing, by the generator of the GAN, the one or more static or dynamic characteristics data to generate the anonymized characteristic data, wherein the GAN is trained on training data until a discriminator of the GAN cannot distinguish anonymized characteristic data generated by the generator from actual characteristics of users specified in the training data.

2. The method of claim 1, wherein the anonymization operation is applied to dynamics characteristics data for the operator collected from sensors in a physical environment that detect movements or micromovements of the operator in the physical environment.

3. The method of claim 1, wherein the first user is one of a plurality of users to which the avatar is to be rendered in the virtual environment, and wherein a second user in the plurality of users is presented with a second avatar to represent the operator, wherein the second avatar has at least one of different static or different dynamic characteristics than the first avatar based on a classification of the second user into an affinity group.

4. The method of claim 3, wherein the affinity groups in the plurality of affinity groups correspond to different levels of affinity between the operator and users in the plurality of users, and wherein an affinity group, having a relatively higher level of affinity between the operator and users of the affinity group than other affinity groups, has a corresponding security and privacy policy with relatively lower levels of anonymization of the static or dynamic characteristics.

5. The method of claim 4, wherein each affinity group in the plurality of affinity groups has corresponding specifications of at least one of static or dynamic characteristics that are to be anonymized by applying the anonymization operation, and wherein the at least two affinity groups have different corresponding specifications of at least one of static or dynamic characteristics that are to be anonymized.

6. The method of claim 5, wherein for a first affinity group of the at least two affinity groups has a first number of static or dynamic characteristics that are to be anonymized, and wherein a second affinity group of the at least two affinity groups has a second number of static or dynamic characteristics, different from the first number, that are to be anonymized.

7. The method of claim 3, wherein determining a classification of the first user comprises automatically determining the classification based on at least one of a comparison of characteristics of users in the plurality of users to characteristics of the operator, analysis of social networking interactions between the operator and the users in the plurality of users, contact list information in an electronic communication application associated with the operator, or natural language processing of communications between the operator and the users in the plurality of users.

8. The method of claim 1, wherein the anonymization operation is applied to dynamic characteristics data, and wherein the anonymization operation comprises removing movement or micromovement data having a frequency higher than a predetermined threshold frequency from the dynamic characteristics data to thereby generate the anonymized characteristic data.

9. The method of claim 1, wherein the anonymization operation is applied to dynamic characteristics data, and wherein the anonymization operation comprises adding aggregated high frequency movement or micromovement data, aggregated from movement or micromovement data associated with a plurality of users, to the dynamic characteristic data to thereby generate the anonymized characteristic data.

10. A computer program product comprising a computer readable storage medium having a computer readable program stored therein, wherein the computer readable program, when executed on a data processing system, causes the data processing system to:

identify a first user that is interacting with the virtual environment and to whom the avatar is to be rendered in the virtual environment;

determine a classification of the first user with regard to a plurality of affinity groups specifying a level of affinity between the first user and an operator of the avatar;

retrieve a first user security and privacy policy (USPP) data structure, associated with the operator, specifying security and privacy policies for each affinity group in the plurality of affinity groups, wherein at least two affinity groups have different security and privacy policies specified in the USPP data structure;

apply, based on the classification of the first user into an affinity group, and a security and privacy policy associated with the affinity group as specified in the USPP data structure, an anonymization operation to at least one of static or dynamic characteristics data for the operator which are used to render the avatar, to thereby generate anonymized characteristic data; and output the anonymized characteristic data for rendering the avatar in the virtual environment, wherein the avatar is rendered as a first avatar that has avatar characteristics corresponding to the anonymized versions of the at least one static or dynamic characteristics data, wherein applying the anonymization operation comprises:
inputting the one of static or dynamic characteristics data for the operator which are used to render the avatar into a trained generator of a trained generative adversarial network (GAN); and processing, by the generator of the GAN, the one or more static or dynamic characteristics data to generate the anonymized characteristic data, wherein the GAN is trained on training data until a discriminator of the GAN cannot distinguish anonymized characteristic data generated by the generator from actual characteristics of users specified in the training data.

11. The computer program product of claim 10, wherein the anonymization operation is applied to dynamics characteristics data for the operator collected from sensors in a physical environment that detect movements or micromovements of the operator in the physical environment.

12. The computer program product of claim 10, wherein the first user is one of a plurality of users to which the avatar is to be rendered in a virtual environment, and wherein a second user in the plurality of users is presented with a second avatar to represent the operator, wherein the second avatar has at least one of different static or different dynamic characteristics than the first avatar based on a classification of the second user into an affinity group.

13. The computer program product of claim 12, wherein the affinity groups in the plurality of affinity groups correspond to different levels of affinity between the operator and users in the plurality of users, and wherein an affinity group, having a relatively higher level of affinity between the operator and users of the affinity group than other affinity groups, has a corresponding security and privacy policy with relatively lower levels of anonymization of the static or dynamic characteristics.

14. The computer program product of claim 13, wherein each affinity group in the plurality of affinity groups has corresponding specifications of at least one of static or dynamic characteristics that are to be anonymized by applying the anonymization operation, and wherein the at least two affinity groups have different corresponding specifications of at least one of static or dynamic characteristics that are to be anonymized.

15. The computer program product of claim 12, wherein determining a classification of the first user comprises automatically determining the classification based on at least one of a comparison of characteristics of users in the plurality of users to characteristics of the operator, analysis of social networking interactions between the operator and the users in the plurality of users, contact list information in an electronic communication application associated with the operator, or natural language processing of communications between the operator and the users in the plurality of users.

16. The computer program product of claim 10, wherein the anonymization operation is applied to dynamic characteristics data, and wherein the anonymization operation comprises removing movement or micromovement data having a frequency higher than a predetermined threshold frequency from the dynamic characteristics data to thereby generate the anonymized characteristic data.

17. The computer program product of claim 10, wherein the anonymization operation is applied to dynamic characteristics data, and wherein the anonymization operation comprises adding aggregated high frequency movement or micromovement data, aggregated from movement or micromovement data associated with a plurality of users, to the dynamic characteristic data to thereby generate the anonymized characteristic data.

18. An apparatus comprising:
at least one processor; and
at least one memory coupled to the at least one processor, wherein the at least one memory comprises instructions which, when executed by the at least one processor, cause the at least one processor to:
identify a first user that is interacting with the virtual environment and to whom the avatar is to be rendered in the virtual environment;
determine a classification of the first user with regard to a plurality of affinity groups specifying a level of affinity between the first user and an operator of the avatar;
retrieve a first user security and privacy policy (USPP) data structure, associated with the operator, specifying security and privacy policies for each affinity group in the plurality of affinity groups, wherein at least two affinity groups have different security and privacy policies specified in the USPP data structure;
apply, based on the classification of the first user into an affinity group, and a security and privacy policy associated with the affinity group as specified in the USPP data structure, an anonymization operation to at least one of static or dynamic characteristics data for the operator which are used to render the avatar, to thereby generate anonymized characteristic data; and
output the anonymized characteristic data for rendering the avatar in the virtual environment, wherein the avatar is rendered as a first avatar that has avatar characteristics corresponding to the anonymized versions of the at least one static or dynamic characteristics data,
wherein applying the anonymization operation comprises:
inputting the one of static or dynamic characteristics data for the operator which are used to render the avatar into a trained generator of a trained generative adversarial network (GAN); and
processing, by the generator of the GAN, the one or more static or dynamic characteristics data to generate the anonymized characteristic data, wherein the GAN is trained on training data until a discriminator of the GAN cannot distinguish anonymized characteristic data generated by the generator from actual characteristics of users specified in the training data.

* * * * *